United States Patent
Perronnin et al.

(10) Patent No.: US 8,532,399 B2
(45) Date of Patent: Sep. 10, 2013

(54) LARGE SCALE IMAGE CLASSIFICATION

(75) Inventors: Florent Perronnin, Domene (FR); Jorge Sanchez, Cordoba (AR); Thomas Mensink, Grenoble (FR)

(73) Assignee: Xerox Corporation, Norwalk, CT (US)

(*) Notice: Subject to any disclaimer, the term of this patent is extended or adjusted under 35 U.S.C. 154(b) by 381 days.

(21) Appl. No.: 12/859,898

(22) Filed: Aug. 20, 2010

(65) Prior Publication Data
US 2012/0045134 A1 Feb. 23, 2012

(51) Int. Cl.
*G06K 9/00* (2006.01)

(52) U.S. Cl.
USPC .......................................................... 382/224

(58) Field of Classification Search
None
See application file for complete search history.

(56) References Cited

U.S. PATENT DOCUMENTS

| | | | |
|---|---|---|---|
| 7,271,747 B2 * | 9/2007 | Baraniuk et al. ............... | 341/87 |
| 7,680,341 B2 | 3/2010 | Perronnin | |
| 7,756,341 B2 | 7/2010 | Perronnin | |
| 7,885,794 B2 * | 2/2011 | Liu et al. .......................... | 703/2 |
| 7,949,186 B2 * | 5/2011 | Grauman et al. ............. | 382/170 |
| 8,055,597 B2 * | 11/2011 | Acharya ........................ | 706/45 |
| 8,139,833 B2 * | 3/2012 | Fain ............................... | 382/128 |
| 2008/0069456 A1 | 3/2008 | Perronnin | |
| 2009/0144033 A1 | 6/2009 | Liu et al. | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0127995 A1 * | 5/2010 | Rigazio et al. ................. | 345/173 |
| 2010/0174670 A1 * | 7/2010 | Malik et al. .................... | 706/12 |
| 2010/0189354 A1 | 7/2010 | de Campos et al. | |
| 2010/0191743 A1 | 7/2010 | Perronnin et al. | |
| 2012/0269425 A1 * | 10/2012 | Marchesotti et al. ......... | 382/159 |

OTHER PUBLICATIONS

Winn et al. (Oct. 2005) "Object categorization by learned universal visual dictionary." Proc. 10th Int'l Conf. on Computer Vision, vol. 2 pp. 1800-1807.*
Manning et al. (Apr. 2009) "Introduction to information retrieval." Retrieved from http://www-nlp.stanford.edu/IR-book/.*
Lazebnik et al., "Beyond Bags of Features: Spatial Pyramid Matching for Recognizing Natural Scene Categories," In: CVPR. (2006).
Jaakkola et al., "Exploiting generative models in discriminative classifiers," In: NIPS. (1999).
David G. Lowe, "Distinctive Image Features from Scale-Invariant Keypoints," International Journal of Computer Vision (2004).
Perronnin et al., "Fisher Kernels on Visual Vocabularies for Image Categorization," In: CVPR. (2007).
Torralba et al., "80 million tiny images: a large dataset for non-parametric object and scene recognition," IEEE PAMI (2008).

(Continued)

*Primary Examiner* — Barry Drennan
(74) *Attorney, Agent, or Firm* — Faye Sharpe LLP

(57) ABSTRACT

An input image representation is generated based on an aggregation of local descriptors extracted from an input image, and is adjusted by performing a power normalization, an Lp normalization such as an L2 normalization, or both. In some embodiments the generating comprises modeling the extracted local descriptors using a probabilistic model to generate the input image representation comprising probabilistic model component values for a set of probabilistic model components. In some such embodiments the probabilistic model comprises a Gaussian mixture model and the probabilistic model components comprise Gaussian components of the Gaussian mixture model. The generating may include partitioning the input image into a plurality of image partitions using a spatial pyramids partitioning model, extracting local descriptors, such as Fisher vectors, from the image partitions, and concatenating the local descriptors extracted from the image partitions.

20 Claims, 3 Drawing Sheets

(56) References Cited

OTHER PUBLICATIONS

Bo et al., "Efficient Match Kernels between Sets of Features for Visual Recognition," In: NIPS. (1999).
Boiman et al., "In Defense of Nearest-Neighbor Based Image Classification," In: CVPR (2008).
Yang et al., "Linear Spatial Pyramid Matching Using Sparse Coding for Image Classification," In: CVPR (2009).
Perronnin et al., "Large-Scale Image Categorization with Explicit Data Embedding," In: CVPR (2010).
Maji et al., "Max-Margin Additive Classifiers for Detection," In: ICCV (2009).
Wang et al., "Learning Image Similarity from Flickr Groups Using Stochastic Intersection Kernel Machines," In: ICCV (2009).
Li et al., "Landmark Classification in Large-Scale Image Collections," In: ICCV (2009).
Zhang et al., "Local features and kernels for classification of texture and object categories: A comprehensive study," IJCV 73 (2007).
Van Gemert et al., "Visual Word Ambiguity," IEEE PAMI (2010).
Farquhar et al., "Improving "bag-of-keypoints" image categorisation: Generative Models and PDF-Kernels," Technical report, University of Southampton (2005).
Csurka et al., "Visual Categorization with Bags of Keypoints," In: ECCV SLCV Workshop (2004).
Shalev-Shwartz et al., "Pegasos: Primal Estimated sub-GrAdient SOlver for SVM," ICML (2007).

* cited by examiner

LARGE SCALE IMAGE CLASSIFICATION

BACKGROUND

The following relates to the image classification arts, object classification arts, and so forth.

In image classification, the image is typically converted to a quantitative representation that embodies image characteristics of interest and which is then compared with corresponding quantitative representations of other images, and/or processed using a classifier trained to process the quantitative representation. Image classifiers have applications such as indexing of images, retrieval of images, or so forth.

The quantitative image representation is sometimes derived from so-called "patches". In this approach, the image is divided into regions, or patches, a representative vector is constructed for each patch, and these results are concatenated or otherwise combined to generate the quantitative representation. The use of patches distributed across the image ensures that the quantitative representation is representative of the image as a whole while also including components representing smaller portions of the image. In some approaches, the patches may be of varying sizes and may overlap in order to provide components representing different objects (e.g., faces, animals, sky, or so forth) having different size scales and located at different, and possibly overlapping, places in the image.

One approach that has been used is the "bag-of-visual-words" (BOV) concept derived from text document classification schemes. This analogizes to the classifying of text documents, in which a "bag of words" is suitably a vector or other representation whose components indicate occurrence frequencies (or counts) of words in the text document. The bag of words is then a suitable text document representation for classification tasks. To extend this approach to image classification, a "visual" vocabulary is created. In some approaches, a visual vocabulary is obtained by clustering low-level features extracted from patches of training images, using for instance K-means. In other approaches, a probabilistic framework is employed, and it is assumed that there exists an underlying generative model such as a Gaussian Mixture Model (GMM), and the visual vocabulary is estimated for instance using Expectation-Maximization (EM). In such "bag of visual words" representations, each "word" corresponds to a grouping of typical low-level features. Depending on the training images from which the vocabulary is derived, the visual words may, for instance, correspond to image features such as objects, or characteristic types of background, or so forth.

The Fisher kernel (FK) is a generic framework which combines the benefits of generative and discriminative approaches for image classification. In the context of image classification the FK has been used to extend the bag-of-visual-words (BOV) representation by going beyond count statistics. See, e.g. Perronnin et al., "Fisher kernels on visual vocabularies for image categorization" in CVPR (2007) which is incorporated herein by reference in its entirety.

For further reference, the following U.S. patents and published U.S. patent applications are referenced, and each of the following patents/publications is incorporated herein by reference in its entirety: Perronnin, U.S. Pub. No. 2008/0069456 A1 published Mar. 20, 2008 and titled "Bags of visual context-dependent words for generic visual categorization"; Liu et al., U.S. Pub. No. 2009/0144033 A1 published Jun. 4, 2009 and titled "Object comparison, retrieval, and categorization methods and apparatuses"; Csurka et al., U.S. Pub. No. 2010/0040285 A1 published Feb. 18, 2010 and titled "System and method for object class localization and semantic class based image sementation"; Perronnin et al., U.S. Pub. No. 2010/0092084 A1 published Apr. 15, 2010 and titled "Representing documents with runlength histograms"; Perronnin et al., U.S. Pub. No. 2010/0098343 A1 published Apr. 22, 2010 and titled "Modeling images as mixtures of image models"; Perronnin et al., U.S. Pub. No. 2010/0191743 A1 published Jul. 29, 2010 and titled " Contextual similarity measures for objects and retrieval, classification, and clustering using same"; de Campos et al., U.S. Pub. No. 2010/0189354 A1 titled "Modeling images as sets of weighted features"; Perronnin, U.S. Pat. No. 7,756,341 issued Jul. 13, 2010 and titled "Generic visual categorization method and system"; and Perronnin, U.S. Pat. No. 7,680,341 issued Mar. 16, 2010 and titled "Generic visual classification with gradient components-based dimensionality enhancement."

The following sets forth improved methods and apparatuses.

BRIEF DESCRIPTION

In some illustrative embodiments disclosed as illustrative examples herein, a storage medium stores instructions executable by a processor to perform a method comprising: generating an input image representation based on an aggregation of local descriptors extracted from an input image and, during or after the generating, adjusting the input image representation, the adjusting comprising performing a power-based or logarithmic-based sparsity reduction operation on the input image representation.

In some embodiments as set forth in the immediately preceding paragraph, the generating comprises modeling the extracted local descriptors using a probabilistic model to generate the input image representation comprising probabilistic model component values for a set of probabilistic model components, and the adjusting further includes performing an Lp normalization. In some such embodiments the probabilistic model comprises a Gaussian mixture model and the probabilistic model components comprise Gaussian components of the Gaussian mixture model.

In some illustrative embodiments disclosed as illustrative examples herein, a method comprises: generating an input image representation for an input image by modeling local descriptors extracted from the input image using a gradient vector $\nabla_\lambda f_\lambda(X)$ where X denotes the local descriptors extracted from the input image and $f_{80}(X)$ denotes a probability function parameterized by parameters $\lambda$; and, during or after the generating, adjusting the input image representation, the adjusting comprising performing an Lp normalization; wherein the generating and adjusting are performed by a digital processor. In some such embodiments the performing of an Lp normalization comprises performing an L2 normalization.

In some illustrative embodiments disclosed as illustrative examples herein, a method comprises: partitioning an input image into a plurality of image partitions using a spatial pyramids partitioning model; extracting local descriptors from the image partitions; modeling the extracted local descriptors of each image partition using a probabilistic model to generate a corresponding image partition representation comprising probabilistic model component values for a set of probabilistic model components; combining the image partition representations to generate an input image representation; and wherein the generating and adjusting are performed by a digital processor. In some such embodiments the modeling comprises generating the image partition representation of the local descriptors of each image partition as a Fisher vector representation, and the combining comprises concatenating the Fisher vector representations to generate the input image representation.

In some illustrative embodiments disclosed as illustrative examples herein, storage medium stores instructions executable by a processor to perform a method set forth in one of the two immediately preceding paragraphs.

DETAILED DESCRIPTION

The inventors have studied image classification employing bag of visual words (BOV) approaches, and have identified certain improvements that are disclosed herein. The disclosed improvements alleviate the rapid computational complexity increase that conventionally arises when processing large quantities of images. Training of existing BOV non-linear classifiers is typically of order $O(N^2)$ or higher, where N is the number of training images. This makes training difficult or impossible for training sets of quantities in the tens of thousands or more. The use of a linear classifier can reduce this complexity to order $O(N)$, but using a linear classifier typically produces a performance loss. Another, more general, deficiency of BOV approaches is that the BOV image representation entails substantial lossy quantization of the image content.

In some illustrative embodiments disclosed herein, image classification employing the Fisher Kernel (FK) is used to extend the BOV approach. The FK approach encodes not only the number of occurrences of each visual word (as in BOV), but it also encodes additional information about the distribution of the descriptors across the image.

Figure 1:
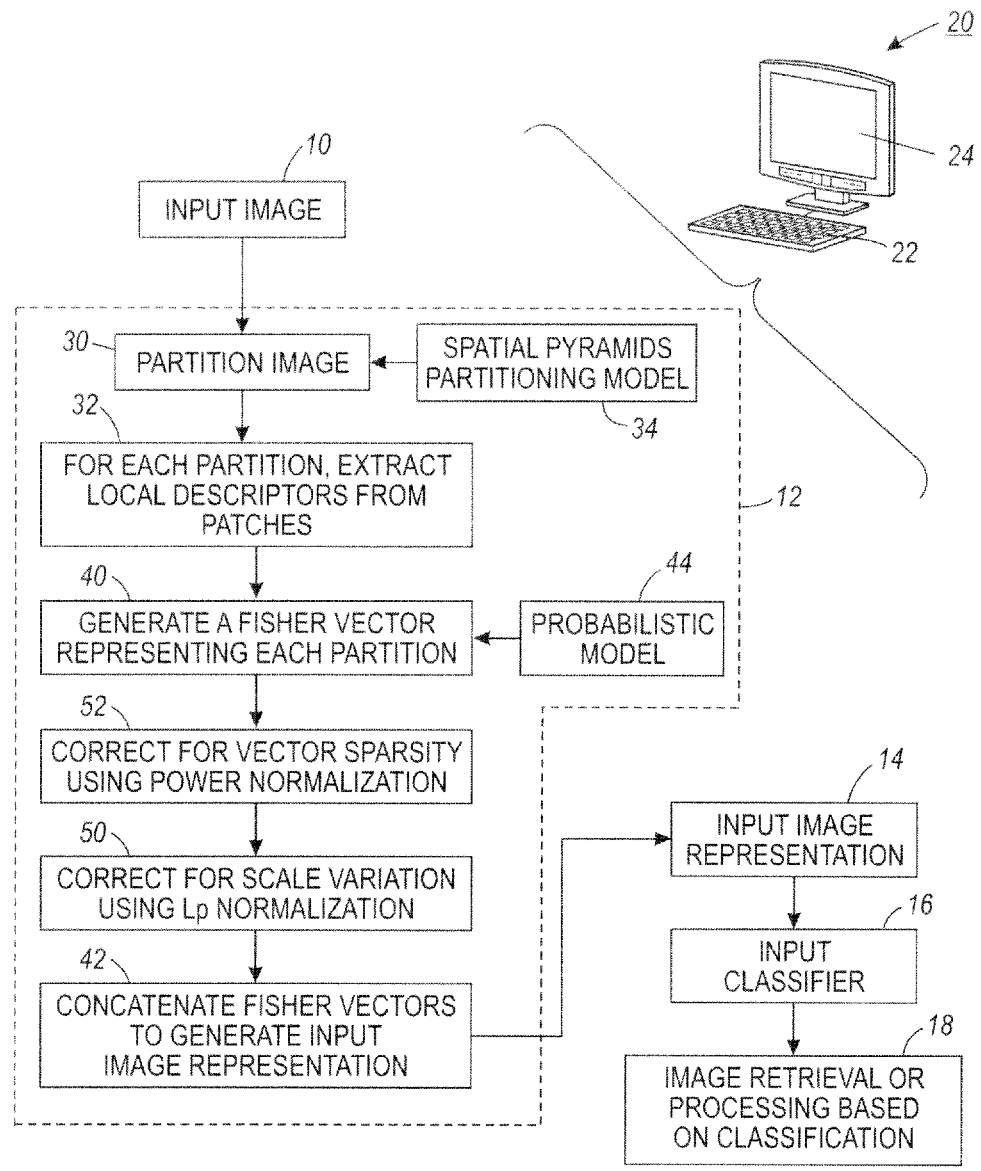
FIG. 1 diagrammatically shows an image processing system employing an input image representation as disclosed herein.

With reference to FIG. 1, an input image 10 is processed by an image representation computation module 12 to generate an input image representation 14 which can be variously used. In the illustrative example of FIG. 1, the input image representation 14 is input to an image classifier 16 to assign a class to the input image 10, and this classification serves as input to a further operation 18, which may for example be an image retrieval operation that retrieves images from a database that are annotated with the same or a similar classification, or may be used to annotate and store the input image 10 in such a database, or may be used as a filter for removing images not related to a class of interest, or may be otherwise used.

The illustrative image processing components 12, 16, 18 are suitably embodied by a digital processor or digital processing device, such as an illustrative computer 20 including a keyboard 22 or other input device and a display device 24. Alternatively, the image processing components 12, 16, 18 may be embodied by another digital processor or digital processing device such as a digital camera, a digital video recorder, a personal data assistant (FDA) or "smartphone" (optionally including a built-in camera), a network server, an electronic tablet, or so forth.

The input image 10 comprises a digital image that may be variously generated, for example by a digital camera, or by a film-based camera whose photograph is scanned by an optical scanner to generate a digital image, or by a drawing application program, graphical art program, or other application program that outputs a bitmapped or pixmapped image, or so forth. The input image 10 may be generated at the computer 20, or may be received from elsewhere by the computer 20 via a digital network such as the Internet or via a portable digital storage medium such as an optical disk. The input image 10 may be grayscale, binary, color, or so forth. Although not illustrated, it is to be understood that the image processing components may include one or more format converters (not shown) that provide the input image 10 in a standard format. Still further, while in the illustrative examples the input image 10 is two-dimensional, more generally the input image 10 may be of higher dimensionality, for example a three-dimensional image generated by a computed tomography (CT) scanner.

Additionally, it will be appreciated that the illustrative image processing components 12, 16, 18 are suitably embodied as a storage medium storing instructions executable by a digital processor or digital processing device to perform the functionality of the image processing components 12, 16, 18. The storage medium may, for example, be a hard disk drive or other magnetic storage medium, and/or an optical disc or other optical storage medium, and/or a random access memory (RAM), read-only memory (ROM), flash memory, or other electronic storage medium; various combinations thereof, or so forth.

The image representation computation module 12 generates the input image representation 14 based on local descriptors that are extracted from an input image 10. In a suitable approach, various patches are defined in the image and local descriptors are extracted from each patch. In the illustrative embodiment, a partitioning operation 30 first performed to partition the input image 10 into a plurality of image partitions, followed by an operation 32 of extracting local descriptors from patches defined in each image partition. The illustrative partitioning operation 30 employs a spatial pyramids partitioning model 34, which is described for example in Lazebnik et al., "Beyond bags of features: Spatial pyramid matching for recognizing natural scene categories", in CVPR (2006). The spatial pyramids partitioning model 34 employs a "pyramidal" partitioning in which the entire image is successively partitioned into levels if increasing image partition resolution. For example, in one specific model: the "level 0" image partition is the entire input image 10; the "level 1" image partitions comprise a 2×2 partitioning (that is, four quadrants) spanning the input image 10; the "level 2" image partitions comprise a 4×4 partitioning (that is, sixteen image partitions) spanning the input image 10; and optionally so forth. In another illustrative partitioning model: the "level 0" image partition is the entire input image 10; "level 1" comprises a vertical tripartite partitioning into top, middle, and bottom image partitions; and the "level 2" image partitions comprise 2×2 partitioning (that is, four quadrants) spanning the input image 10.

The operation 32 extracts local descriptors for each image partition. In some embodiments, the local descriptors comprise SIFT descriptors. See, e.g. Lowe, "Distinctive image features from scale-invariant keypoints", IJCV vol. 60 (2004). In one illustrative example employing SIFT features, the features are extracted from 32×32 pixel patches on regular grids (every 16 pixels) at five scales, using 128-D SIFT descriptors. Other suitable features include simple 96-D color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA). These are merely illustrative examples, and additional and/or other local descriptors can be used.

With continuing reference to FIG. 1, an operation 40 generates an input image representation based on the extracted local descriptors. In the illustrative example, the operation 40 computes a Fisher vector representation for each image partition, and in an operation 42 the Fisher vector representations are concatenated to form an input image representation for the overall image. More generally, the extracted local descriptors of each image partition are modeled using a probabilistic model 44 to generate a corresponding image partition representation comprising probabilistic model component values for a set of probabilistic model components, and the image partition representations are combined to generate an input image representation.

An illustrative example of computing a Fisher vector representation for an image (or image partition) is described. Let $X=\{x_t, t=1, \ldots, T\}$ be the set of local descriptors extracted from T patches of an image (or image partition). It is assumed here that the generation process of X can be modeled by a probability density function $u_\lambda$ with parameters $\lambda$. The features X can then be described by a gradient vector (see, e.g. Jaakkola et al., "Exploiting generative models in discriminative classifiers", in NIPS (1999)):

$$G_\lambda^X = \nabla_\lambda f_\lambda(X) = \frac{1}{T}\nabla_\lambda (\log u_\lambda(X)) \qquad (1)$$

where X denotes the local descriptors extracted from the input image (or image partition) and $f_\lambda(X)$ denotes a probability function parameterized by parameters $\lambda$. In the rightmost expression of Equation (1), the illustrative probability function $f_\lambda(X)=T^{-1} \log u_\lambda(X)$ is a log-likelihood composition of the probability density function $u_\lambda$. The gradient of the log-likelihood describes the contribution of the parameters to the generation process. The dimensionality of this vector depends only on the number of parameters in $\lambda$, but not on the number of patches T. A natural kernel on these gradients is:

$$K(X,Y)=G_\lambda^{X'}F_\lambda^{-1}G_\lambda^Y \qquad (2)$$

where $F_\lambda$ is the Fisher information matrix of $u_\lambda$, and is given by:

$$F_{80}E_{x-u}^\lambda[\nabla_\lambda \log u_\lambda(x) \nabla_\lambda \log u_\lambda(x)'] \qquad (3).$$

As $F_\lambda$ is symmetric and positive definite, $F_\lambda^{-1}$ has a Cholesky decomposition $F_\lambda^{-1}=L_\lambda'L_\lambda$ and K(X,Y) can be rewritten as a dot-product between normalized vectors $G_\lambda$ with:

$$G_\lambda^X = L_\lambda G_\lambda^X \qquad (4).$$

The vector $G_\lambda^X$ is referred to herein as the Fisher vector representation of the set of local descriptors X extracted from an image or image partition. Learning a kernel classifier using the kernel of Equation (2) is equivalent to learning a linear classifier on the Fisher vectors $G_\lambda^X$. Learning linear classifiers can be done efficiently.

In illustrative examples set forth herein, the probability density function $u_\lambda$ is selected to be a Gaussian mixture model (GMM). See, e.g. Perronnin et al., "Fisher kernels on visual vocabularies for image categorization" in CVPR (2007). Here $u_\lambda=\Sigma_{i=1}^K \omega_i u_i(x)$ and the parameters are $\lambda=\{\omega_i, v_i, \Sigma_i, i=1, \ldots, K\}$, where $\omega_i$, $\mu_i$, and $\Sigma_i$ are respectively the mixture weight, mean vector, and covariance matrix of the Gaussian $u_i$. It is assumed in the illustrative examples employing a GMM probability density function that the covariance matrices $\Sigma_i$ are diagonal and the thus corresponding variance vector is denoted as $\sigma_i^2$. The GMM $u_\lambda=\Sigma_{i=1}^K \omega_i u_i(x)$ is suitably trained on a training set of images using a suitable training algorithm such as maximum likelihood (ML) estimation. The trained GMM is intended to describe the content of any image within a range of interest (for example, any color photograph if the range of interest is color photographs; or, any image of a black and white document if the range of interest is black and white documents, or so forth). It is further assumed in these illustrative examples that the descriptor sets $x_t$ for the various image patches $t=1, \ldots, T$ are generated independently by the GMM $u_\lambda$, and therefore:

$$G_\lambda^X = \frac{1}{T}\sum_{t=1}^T \nabla_\lambda (\log u_\lambda(x_t)). \qquad (5)$$

The gradient is considered here with respect to the mean and standard deviation parameters (typically, the gradient with respect to the weight parameters provides little additional information). Use is made of the diagonal closed-form approximation (see e.g. Perronnin et al., "Fisher kernels on visual vocabularies for image categorization" in CVPR (2007)), in which case the normalization of the gradient by $L_\lambda=F^{\lambda-1/2}$ is effectively a whitening of the dimensions. Let $\gamma_t(i)$ be the soft assignment of descriptor $x_t$ to the Gaussian i according to:

$$\gamma_t(i) = \frac{\omega_i u_i(x_t)}{\sum_{j=1}^K \omega_j u_j(x_t)}. \qquad (6)$$

Let D denote the dimensionality of the descriptors $x_t$. Let $\mathcal{G}_{\mu,i}^X$ Let (resp. $\mathcal{G}_{\sigma,i}^X$) be the D-dimensional gradient with respect to the mean $\mu_i$ (resp. standard deviation $\sigma_i$) of the Gaussian component i. It can be shown that the following hold:

$$\mathcal{G}_{\mu,i}^X = \frac{1}{T\sqrt{\omega_i}}\sum_{t=1}^T \gamma_t(i)\left(\frac{x_t - \mu_i}{\sigma_i}\right) \qquad (7)$$

and $$\mathcal{G}_{\sigma,i}^X = \frac{1}{T\sqrt{2\omega_i}}\sum_{t=1}^T \gamma_t(i)\left[\frac{(x_t - \mu_i)^2}{\sigma_i^2} - 1\right], \qquad (8)$$

where the division between vectors is as a term-by-term operation. The final gradient vector $\mathcal{G}_\lambda^X$ is the concatenation of the and $\mathcal{G}_{\mu,i}^X$ and $\mathcal{G}_{\sigma,i}^X$ vectors for $i=1 \ldots K$ and is therefore 2KD-dimensional.

In embodiments employing image partitioning, for example the illustrative embodiment employing the spatial pyramids partitioning model 34, the operation 40 generates a Fisher vector representation for each partition in accordance with Equation (5). The operation 42 then concatenates these Fisher vectors to generate an input image representation. Advantageously, this retains spatial location information in the image, since (by way of illustrative example) if a dog is shown in a lower left quadrant of the image then the Fisher vector for that quadrant will particularly reflect descriptors of dog images.

On the other hand, if image partitioning is not employed, then partitioning operation 30 and concatenation operation 42 are omitted, and the operations 32, 40 operate on the entire input image 10 without partitioning, and the input image representation is the Fisher vector representation output directly by the operation 40.

The inventors have recognized that the input image representation (whether generated with partitioning/concatenation or without) may sometimes have certain deficiencies. One identified potential deficiency is variation in the input image representation depending on the amount of background information. Another potential deficiency of the Fisher vector representation which the inventors have identified is sparsity of the Fisher vector. As described herein, these deficiencies can be remedied by performing certain disclosed adjustments 50, 52 on the Fisher vectors representing the image or image partition. In embodiments employing image partitioning in the construction of the Fisher vector (e.g., embodiments including the partition and vector concatenation operations 30, 42), the adjustments 50, 52 are preferably performed on each Fisher vector representing an image partition prior to the concatenation operation, as shown in FIG. 1. The adjustments 50, 52 are discussed in turn.

The potential deficiency pertaining to variation in the input image representation depending on the amount of background information is demonstrated in the following. Assume that the descriptors $X=\{x_t, t=1, \ldots, T\}$ of a given image follow a distribution p. According to the law of large numbers (which sets forth that the sample average converges toward the expected value when T increases). Equation (5) can be rewritten as:

$$G_\lambda^X \approx \nabla_\lambda E_{x \sim p} \log u_\lambda(x) = \nabla_\lambda \int_\lambda p(x) \log u_\lambda(x) dx. \qquad (9)$$

Further assume that the distribution p can be decomposed into a mixture of two parts: a background image-independent part which follows $u_\lambda$ and an image-specific part which follows an image-specific distribution q. Let $0 \leq \omega \leq 1$ be the proportion of image-specific information contained in the image. Then:

$$p(x) = \omega q(x) + (1-\omega) u_\lambda(x) \qquad (10).$$

This can be used to rewrite the Fisher vector representation $G_\lambda^X$ as:

$$G_\lambda^X \approx \omega \nabla_\lambda \int_x q(x) \log u_\lambda(x) dx + (1-\omega) \nabla_\lambda \int_x u_\lambda(x) \log u_\lambda(x) dx. \qquad (11)$$

If the values of the parameters $\lambda$ were estimated with a maximum likelihood (ML) process, that is, to maximize (at least locally and approximately) $E_{x \sim u_\lambda} \log u_\lambda(x)$, then it follows:

$$\nabla_\lambda \int_x u_\lambda(x) \log u_\lambda(x) dx = \nabla_\lambda E_{x \sim u_\lambda} \log u_\lambda(x) \approx 0. \qquad (12)$$

Consequently:

$$G_\lambda^X \approx \omega \nabla_\lambda \int_x q(x) \log u_\lambda(x) dx = \omega \nabla_\lambda E_{x \sim q} \log u_\lambda(x). \qquad (13)$$

This shows that the image-independent information is approximately discarded from the Fisher vector representation, which is an advantageous property of the representation.

However, the Fisher vector representation still depends on the proportion of image-specific information $\omega$. Consequently, two images containing the same object but different amounts of background information (for example, two images containing the same object at different scales) will have different Fisher vector representations. This effect is especially problematic for small objects with a small $\omega$ value. In such cases, the background content $(1-\omega)$ will predominate, and the small object will be difficult to detect.

With reference to FIG. 1, a solution to this problem is disclosed which substantially reduces the dependence of the Fisher vector representation on the proportion of image-specific information $\omega$. The disclosed solution is to perform an adjustment operation 50 comprising performing a Lp normalization on one of the probabilistic model component values (or alternatively, on the probabilistic model component values after adjustment by at least one other adjusting operation). In general, an Lp norm of a vector $x=[x_1, \ldots, x_D]$ is of the form $(\Sigma_{i=1}^D x_i^p)^{1/p}$ where p is typically a natural number such as 1, 2, 3, or so forth. In some embodiments, the Lp normalization is an L2 normalization in which p=2 and the norm is of the form $\sqrt{\Sigma_{i=1}^D x_i^2}$, which is well-suited for use in conjunction with dot products. This corrects for "scale" variation, that is, variation in the proportion $\omega$ of the image that is image-specific content.

Performing Lp normalization on the Fisher vector representation $G_\lambda^X$ is equivalent to performing Lp normalization on the gradient vector $\mathcal{G}_\lambda^X$ (see discussion relating to Equations (7) and (8)). Following this latter option (and using the L2 norm) is equivalent to replacing the kernel of Equation (2) with a normalized kernel of the form:

$$\frac{K(X,Y)}{\sqrt{K(X,X)K(Y,Y)}}. \qquad (14)$$

The foregoing should not be viewed as implying that the L2 norm of the Fisher vector is not discriminative. Actually, $\|\mathcal{G}_\lambda^X\| = \omega \|\nabla_\lambda E_{x \sim q} \log u_\lambda(x)\|$ and the second term may contain class-specific information. In practice, removing the dependence on the L2 norm (that is, on both $\omega$ and $\|\nabla_\lambda E_{x \sim q} \log u_\lambda(x)\|$ can lead to substantial improvement.

Another potential deficiency of the Fisher vector representation which the inventors have identified is sparsity of the Fisher vector. This potential deficiency can be seen in that as the number of Gaussian components in the GMM increases (or, more generally, as the number of probabilistic model components of the probabilistic model increases), the Fisher vectors become sparser (or, more generally, the input image representation generated using the probabilistic model becomes sparser). This effect can be easily explained: as the number of Gaussians increases, fewer descriptors $x_t$ are assigned with a significant probability $\gamma_t(i)$ to each Gaussian. In the case where no descriptor $x_t$ is assigned significantly to a given Gaussian component i (that is, where $\gamma_t(i) \approx 0$, $\forall t$), the gradient vectors $\mathcal{G}_{\mu,i}^X$ and $\mathcal{G}_{\sigma,i}^X$ are close to null (compare with Equations (7) and (8)).

Figure 2:
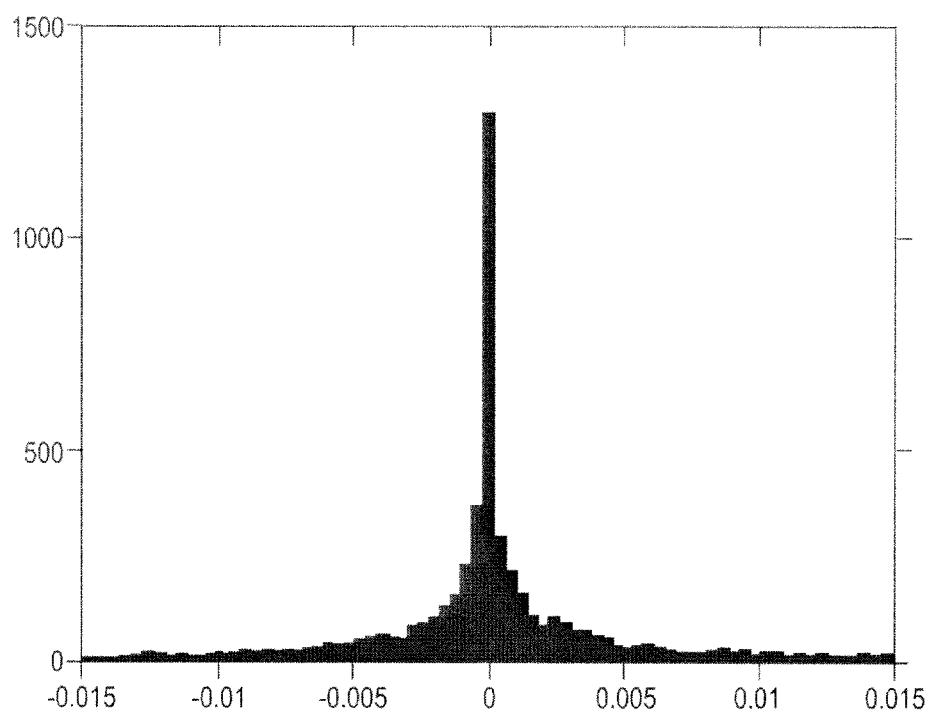
FIG. 2 plots a histogram showing the sparsity of a distribution of the values in the first dimension of an L2-normalized Fisher vector representation employing a GMM with 256 Gaussians.

Hence, with brief reference to FIG. 2, as the number of Gaussian components increases, the distribution of features in a given dimension tends to become more peaky around zero. FIG. 2 illustrates the sparsity of a distribution of the values in the first dimension of an L2-normalized Fisher vector representation employing a GMM with 256 Gaussians.

The histogram has been estimated on the 5,011 training images of the PASCAL Visual Object Classes Challenge (VOC 2007) dataset.

The sparsity of the Fisher vector representation is problematic if a dot product is used to compare Fisher vector representations of two images (so as to compare the images). For example, in some embodiments the image classifier 16 operates by representing one or more "second" images representing a class by a Fisher vector representation (suitably computed by inputting the "second" image or images into the image representation computation module 12 and averaging or otherwise aggregating the resultant Fisher vectors) and computing a comparison between the input image 10 and the second image(s) by computing a dot product between the input image representation 14 and the Fisher vector representation of the second image(s) representing the class.

This process employing a dot product generally provides poor performance if the Fisher vectors are sparse. The dot-product on L2 normalized vectors is equivalent to the L2 distance. The dot-product or L2 distance is a poor measure of similarity on sparse vectors, because the component-wise product is close to zero wherever the component of either vector is close to zero (which is the case for many or even most components when the vectors are sparse).

One possible solution is to replace the dot product with a more robust comparison measure. However, the dot product can be computed efficiently and provides a convenient "per-component" comparison of the Fisher vectors. In contrast, using other comparison measures such as an L1 distance, typically entails using a non-linear classification algorithm in the image classifier.

In the embodiment illustrated in FIG. 1, the vector sparsity is reduced by an adjustment operation 52 that performs a power normalization. The power normalization can be performed on the each probabilistic model component value (as in the illustrative embodiment). However, it is also contemplated to perform the power normalization on each probabilistic model component value after adjustment by at least one other adjusting operation, such as after adjustment by the Lp normalization operation 50. Moreover, it is further contemplated to perform additional or other adjustments not discussed herein, which may be before, after, or interposed amongst the illustrated adjustment operations 50, 52. In alternative contemplated embodiments in which image partitioning is employed but the Lp normalization operation 50 is omitted, the power normalization operation 52 is performed either before the concatentation operation 42 (as shown in FIG. 1) or after the concatentation operation 42.

In one suitable approach, the power normalization 52 comprises applying the formula $sgn(z)|z|^\alpha$ where $\alpha$ denotes the selected power and z denotes one of (i) the probabilistic model component value and (ii) the probabilistic model component value after adjustment by at least one other adjusting operation (e.g., operation 50). In the foregoing formula, the notation |...| denotes absolute value while the function sgn( ... ) is the sign function and has value −1 for negative arguments, +1 for positive arguments, and 0 for an argument of precisely 0.

Figure 3:
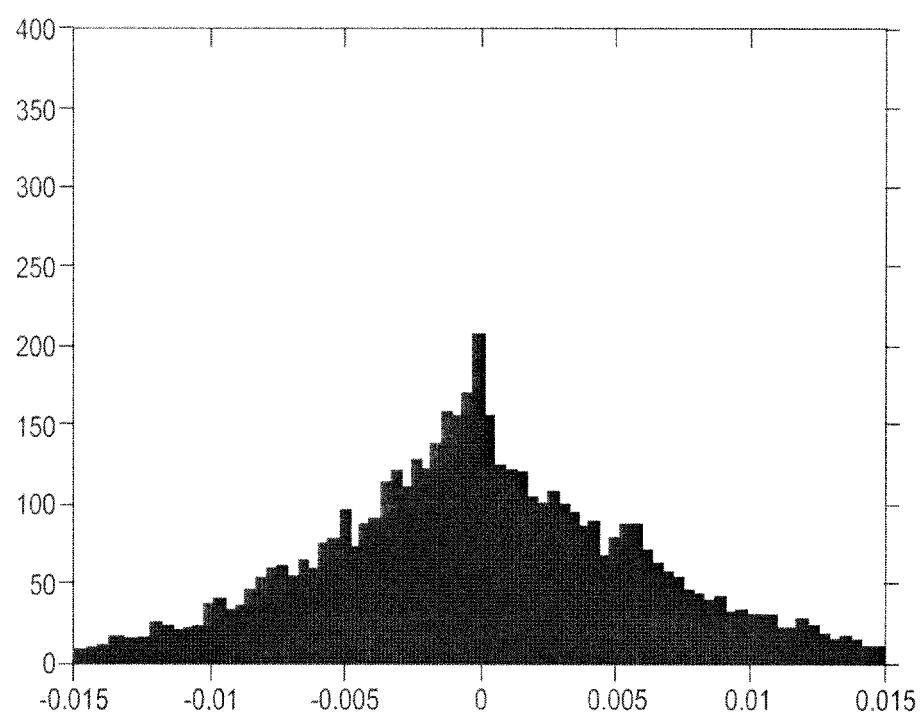
FIG. 3 plots a histogram of the data of FIG. 2 after a power normalization as disclosed herein which suppresses sparsity of the distribution.

FIG. 3 illustrates the substantial reduction in sparsity of the distribution of FIG. 2 through the use of the power normalization operation 52. In the example of FIG. 3, the selected power was $\alpha=0.5$. Compared with the sparse distribution without the power normalization shown in FIG. 2, the distribution with power normalization shown in FIG. 3 has substantially higher probabilistic model component values away from the zero point. In comparing FIGS. 2 and 3, the difference in ordinate scale should be noted (ordinate scale 0 ... 1500 in FIG. 2 versus ordinate scale 0 ... 400 in FIG. 3).

The value $\alpha=0.5$ is illustrative, and other power values may be selected. Moreover, the power-based sparsity reduction formula $sgn(z)|z|^\alpha$ is also illustrative, and other sparsity reduction formulas may be used, for example logarithmic-based sparsity reduction formulas such as $sgn(z)\log(1+\alpha|z|)$ or $asinh(\alpha z)$, where in the latter formula asinh( ... ) is the inverse hyperbolic sine function. The optimal value of $\alpha$ is expected to vary with the number K of Gaussians in the GMM (or, more generally, is expected to vary with the number of probabilistic model components in the probabilistic model). In experiments performed by the inventors using a GMM probabilistic model with $8 \leq K \leq 512$, the value $\alpha=0.5$ was found to be a reasonable value for the power normalization. The value $\alpha=0.5$ is also expected to provide some variance stabilizing.

In some experiments performed by the inventors using the approach described herein with reference to FIG. 1, features were extracted from 32×32 pixel patches on regular grids (every 16 pixels) at five scales. In most experiments only 128-D SIFT descriptors were used. Some experiments also considered simple 96-D color features: a patch is subdivided into 4×4 sub-regions (as is the case of the SIFT descriptor) and in each sub-region the mean and standard deviation are computed for the R, G and B color channels. Both SIFT and color features were reduced to 64 dimensions using Principal Component Analysis (PCA). In these experiments GMMs with K=256 Gaussian components were used in computing the Fisher vector representations. The GMMs were trained using the Maximum Likelihood (ML) criterion and an Expectation-Maximization (EM) algorithm. Linear support vector machine (SVM) classifiers were learned with a hinge loss using the primal formulation and a Stochastic Gradient Descent (SGD) algorithm. See, e.g. Shalev-Shwartz et al., "Pegasos: Primal estimate sub-gradient solver for SVM", in ICML (2007). Experiments were also done with logistic loss, but the learning cost was approximately twice as high with no significant improvement. When using SIFT and color features together, the two classifiers were trained separately and their scores averaged without weighting.

Some experimental results are shown in Table 1, for use of the Fisher vector representation on the PASCAL VOC 2007 dataset (around ten thousand images with 20 object classes) using SIFT features only. The first line of Table 1 corresponds to the baseline, performed without using either adjustment operation 50, 52 and without the partitioning operation 30 (and hence also without the concatenation operation 42). Rows for which the "Power norm" is labeled "Yes" employed the power normalization operation 52 using the formula sgn $(z)|z|^\alpha$ with $\alpha=0.5$. Rows for which the "L2 norm" is labeled "Yes" employed the Lp normalization operation 50 with an L2 normalization. Rows for which the "Pyramid partitioning" is labeled "Yes" employed pyramid partitioning with the partitioning model in which "level 0" is the entire input image, "level 1" is a vertical tripartite partitioning into top, middle, and bottom image partitions, and "level 2" image partitions comprise 2×2 partitioning (that is, four quadrants) spanning the input image. Training was performed on the provided "trainval" set and testing was performed on the "test" set. Classification accuracy was measured using Average Precision (AP). Table 1 reports the average over the 20 classes. To tune the SVM regularization parameters, the "train" set was used for training and the "val" set was used for validation.

TABLE 1

| Power norm | L2 norm | Pyramid partitioning | Average precision (AP) in percent (%) | Improvement in percent (%) |
|---|---|---|---|---|
| No  | No  | No  | 47.9 | —    |
| Yes | No  | No  | 54.2 | +6.3 |
| No  | Yes | No  | 51.8 | +3.9 |
| No  | No  | Yes | 50.3 | +2.4 |
| Yes | Yes | No  | 55.3 | +7.4 |
| Yes | No  | Yes | 55.3 | +7.4 |
| No  | Yes | Yes | 55.5 | +7.6 |
| Yes | Yes | Yes | 58.3 | +10.4 |

As seen in Table 1, the power normalization of the Fisher values alone provided an improvement of +6.3%. Any combination of two of the modifications improves over a single modification, and the combination of all three modifications brings an additional significant increase. Comparing the baseline to the combination of all three modifications, an AP increase from 47.9% to 58.3% is observed, corresponding to a +10.4% absolute improvement.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a processor to perform a method comprising:
    modeling local descriptors X extracted from an input image using a probabilistic model to generate an input image representation comprising probabilistic model component values for a set of probabilistic model components comprising components of a gradient vector $\nabla_\lambda f_\lambda(X)$ where $f_\lambda(X)$ denotes a probability function parameterized by parameters $\lambda$; and
    during or after the generating, adjusting the input image representation, the adjusting comprising performing a signed power-based or signed logarithmic-based sparsity reduction operation on components z of the input image representation where the components z comprise one of:
        each probabilistic model component value, and
        each probabilistic model component value after adjustment by
    at least one other adjusting operation.

2. The non-transitory storage medium as set forth in claim 1, wherein the adjusting comprises applying the formula $\text{sgn}(z)|z|^\alpha$ where $\alpha$ denotes the selected power.

3. The non-transitory storage medium as set forth in claim 2, wherein the selected power is 0.5.

4. The non-transitory storage medium as set forth in claim 1, wherein $f_\lambda(X)$ comprises a Gaussian mixture model.

5. The non-transitory storage medium as set forth in claim 1, wherein:
    the adjusting further comprises performing an Lp normalization on one of (i) the probabilistic model component values and (ii) the probabilistic model component values after adjustment by at least one other adjusting operation.

6. The non-transitory storage medium as set forth in claim 5, wherein the performing of an Lp normalization comprises: performing an L2 normalization.

7. The non-transitory storage medium as set forth in claim 1, wherein the generating comprises:
    partitioning the input image into a plurality of image partitions using a spatial pyramids partitioning model;
    extracting local descriptors from the image partitions; and
    concatenating the local descriptors extracted from the image partitions.

8. The non-transitory storage medium as set forth in claim 7, wherein the input image representation comprises concatenated Fisher vector representations of the local descriptors extracted from the image partitions.

9. The non-transitory storage medium as set forth in claim 1, wherein the method performed by execution of the instructions stored on the storage medium by a processor further comprises:
    computing a quantitative comparison comprising a dot product between the input image representation and a second image representation that is computed from one or more second images using the generating and adjusting operations.

10. The non-transitory storage medium as set forth in claim 9, wherein the method performed by execution of the instructions stored on the storage medium by a processor further comprises:
    assigning a class to the input image based at least on the quantitative comparison.

11. The non-transitory storage medium as set forth in claim 1, wherein the adjusting comprises performing a signed logarithmic-based sparsity reduction operation on components z of the input image representation.

12. The non-transitory storage medium as set forth in claim 11, wherein the adjusting comprises applying the formula $\text{sgn}(z)\log(1+\alpha|z|)$ where $\alpha$ denotes a constant.

13. The non-transitory storage medium as set forth in claim 11, wherein the adjusting comprises applying the formula $\text{asinh}(\alpha z)$ where $\alpha$ denotes a constant.

14. A method comprising:
    generating an input image representation for an input image by modeling local descriptors extracted from the input image using a gradient vector $\nabla_\lambda f_\lambda(X)$ where X denotes the local descriptors extracted from the input image and $f_\lambda(X)$ denotes a probability function parameterized by a set of parameters $\lambda$; and
    during or after the generating, adjusting the input image representation, the adjusting comprising performing an Lp normalization of the form $(\Sigma_i x_i^p)^{1/p}$, where p is a natural number, $x_i$ are the components of the gradient vector $\nabla_\lambda f_\lambda(X)$, and the summation is over all components of the gradient vector $\nabla_\lambda f_\lambda(X)$;
    wherein the generating and adjusting are performed by a digital processor.

15. The method as set forth in claim 14, wherein the performing of an Lp normalization comprises:
    performing an L2 normalization.

16. The method as set forth in claim 14, wherein the adjusting further comprises:
    performing a power normalization in accordance with $\text{sgn}(z)|z|^\alpha$ where $\alpha$ denotes a selected power and z denotes one of (i) a component of the input image representation and (ii) a component of the input image representation after the Lp normalization.

17. The method as set forth in claim 14 wherein the probabilistic model comprises a Gaussian mixture model.

18. The method as set forth in claim 14, wherein the generating further comprises:
    partitioning the input image into a plurality of image partitions using a spatial pyramids partitioning model;

extracting image partition vectors comprising local descriptors from the image partitions; and concatenating the image partition vectors;

wherein the Lp normalization is performed on the image partition vectors prior to the concatenating.

19. The method as set forth in claim 18, wherein the input image representation comprises concatenated Fisher vector representations of the local descriptors extracted from the image partitions.

20. A non-transitory storage medium storing instructions executable by a processor to perform a method comprising:

generating an input image representation for an input image by modeling local descriptors extracted from the input image using a gradient vector $\nabla_\lambda f_\lambda(X)$ where X denotes the local descriptors extracted from the input image and $f_\lambda(X)$ denotes a probability function parameterized by a set of parameters $\lambda$; and during or after the generating, adjusting the input image representation, the adjusting comprising performing an Lp normalization of the form $(\Sigma_i x_i^p)^{1/p}$, where p is a natural number, $x_i$ are the components of the gradient vector $\nabla_\lambda f_\lambda(X)$, and the summation is over all components of the gradient vector $\nabla_\lambda f_\lambda(X)$.

* * * * *